US011803016B2

(12) United States Patent
Bian

(10) Patent No.: US 11,803,016 B2
(45) Date of Patent: Oct. 31, 2023

(54) EDGE COUPLERS INCLUDING A METAMATERIAL LAYER

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 17/701,942

(22) Filed: Mar. 23, 2022

(65) Prior Publication Data

US 2023/0305241 A1 Sep. 28, 2023

(51) Int. Cl.
*G02B 6/42* (2006.01)
*G02B 6/122* (2006.01)
*G02B 6/30* (2006.01)

(52) U.S. Cl.
CPC ......... *G02B 6/4203* (2013.01); *G02B 6/1228* (2013.01); *G02B 6/305* (2013.01)

(58) Field of Classification Search
None
See application file for complete search history.

(56) References Cited

U.S. PATENT DOCUMENTS 8,724,937 B2 * 5/2014 Barwicz .................. G02B 6/30
385/14
9,703,038 B1 * 7/2017 Chen ........................ G02B 6/14
9,964,704 B2 * 5/2018 Hatori ...................... G02B 6/43
10,126,500 B2 11/2018 Qi et al.
10,197,731 B2 * 2/2019 Teng .................... G02B 6/1228
2017/0017034 A1 1/2017 Painchaud et al.
2019/0154919 A1 5/2019 Teng et al.

OTHER PUBLICATIONS

Pavel Cheben et al., "Refractive index engineering with subwavelength gratings for efficient microphotonic couplers and planar waveguide multiplexers," Optics Letter 35, 2526-2528 (2010).
T. Barwicz et al., "An o-band metamaterial converter interfacing standard optical fibers to silicon nanophotonic waveguides," 2015 Optical Fiber Communications Conference and Exhibition (OFC), pp. 1-3, doi: 10.1364/OFC.2015. Th3F.3 (2015).
M. Teng et al., "Trident Shape SOI Metamaterial Fiber-to-Chip Edge Coupler," 2019 Optical Fiber Communications Conference and Exhibition (OFC), pp. 1-3, Tu2J.6 (2019).
Kuanping Shang et al., "Silicon nitride tri-layer vertical Y-junction and 3D couplers with arbitrary splitting ratio for photonic integrated circuits," Opt. Express 25, 10474-10483 (2017).

(Continued)

*Primary Examiner* — Omar R Rojas
(74) *Attorney, Agent, or Firm* — Thompson Hine LLP; Anthony Canale

(57) ABSTRACT

Structures for an edge coupler and methods of fabricating such structures. The structure includes a substrate, a waveguide core, and a metamaterial layer positioned in a vertical direction between the substrate and the waveguide core. The metamaterial layer includes a plurality of elements separated by a plurality of gaps and a dielectric material in the plurality of gaps.

19 Claims, 13 Drawing Sheets

(56) References Cited

OTHER PUBLICATIONS

R. S. Tummidi and M. Webster, "Multilayer Silicon Nitride-Based Coupler Integrated into a Silicon Photonics Platform with <1 dB Coupling Loss to a Standard SMF over O, S, C and L Optical Bands," 2020 Optical Fiber Communications Conference and Exhibition (OFC), pp. 1-3, Th2A.10 (2020).

Mu, Xin & Wu, Sailong & Cheng, Lirong & Fu, H. Y. Edge Couplers in Silicon Photonic Integrated Circuits: A Review. Applied Sciences. 10. 1538. 10.3390/app10041538 (2020).

Martin Papes et al., "Fiber-chip edge coupler with large mode size for silicon photonic wire waveguides," Opt. Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Metamaterial Edge Couplers in the Back-End-Of-Line Stack of a Photonics Chip" filed on Feb. 11, 2021 as a U.S. Appl. No. 17/173,639.

Bian, Yusheng, "Metamaterial Layers for Use With Optical Components" filed on Mar. 2, 2022 as a U.S. Appl. No. 17/684,840.

Bian, Yusheng, "Edge Couplers With Consecutively-Arranged Tapers" filed on Mar. 23, 2022 as a U.S. Appl. No. 17/701,918.

* cited by examiner

US 11,803,016 B2

1

EDGE COUPLERS INCLUDING A METAMATERIAL LAYER

BACKGROUND

The disclosure relates to photonics chips and, more specifically, to structures for an edge coupler and methods of fabricating such structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the cross-sectional area of the tip is considerably smaller than the mode size. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to significant leakage loss of light to the substrate during use. The leakage loss may include a contribution from the mismatch between the large mode size and the small dimensions of the tip of the edge coupler. The leakage loss may be particularly high when coupling light of the transverse magnetic polarization mode from a single-mode optical fiber to a silicon nitride waveguide core.

Improved structures for an edge coupler and methods of fabricating such structures are needed.

SUMMARY

In an embodiment of the invention, a structure includes a substrate, a waveguide core, and a metamaterial layer positioned in a vertical direction between the substrate and the waveguide core. The metamaterial layer includes a plurality of elements separated by a plurality of gaps and a dielectric material in the plurality of gaps.

In an embodiment of the invention, a method includes forming a metamaterial layer including a plurality of elements separated by a plurality of gaps and a first dielectric material in the plurality of gaps, and forming a waveguide core. The metamaterial layer is positioned in a vertical direction between the substrate and the waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
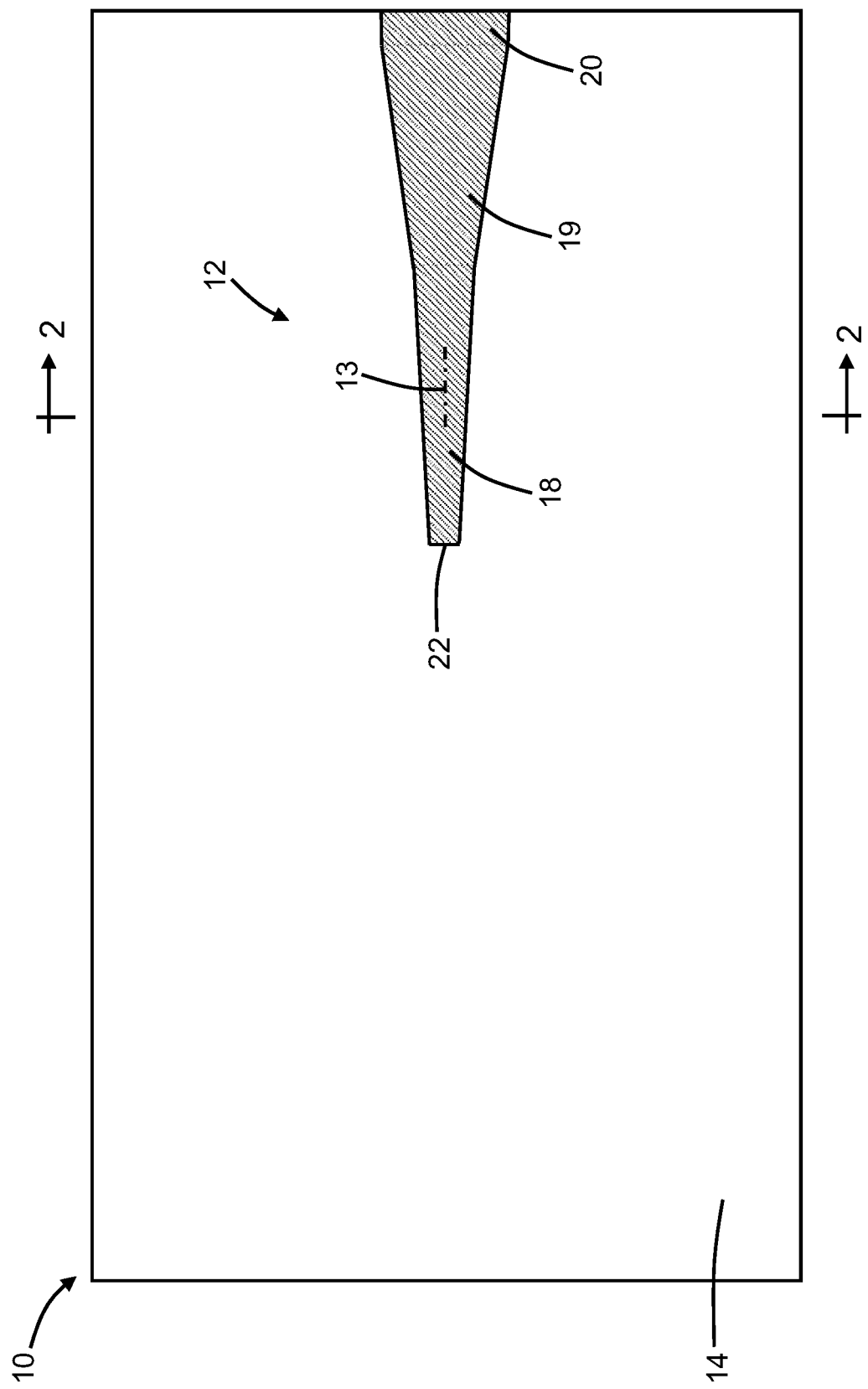
FIG. 1 is a top view of a structure at an initial fabrication stage of a processing method in accordance with embodiments of the invention.
Figure 2:
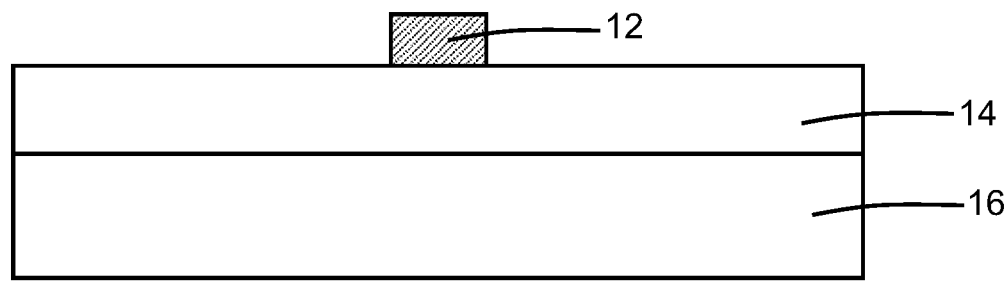
FIG. 2 is a cross-sectional view taken generally along line 2-2 in FIG. 1.

With reference to FIGS. 1, 2 and in accordance with embodiments of the invention, a structure 10 for an edge coupler includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, an additional dielectric layer comprised of a dielectric material, such as silicon dioxide, may be positioned between the dielectric layer 14 and the waveguide core 12.

The waveguide core 12 may be aligned along a longitudinal axis 13. The waveguide core 12 may include inverse taper 18, an inverse taper 19, a section 20 connected to the inverse taper 18 by the inverse taper 19, and an end surface 22 that terminates the inverse taper 18. An inverse taper refers to a tapered section of a waveguide core characterized by a gradual increase in width along a mode propagation direction. In that regard, the inverse taper 18 increases in width W1 with increasing distance along the longitudinal axis 13 from the end surface 22, and the inverse taper 19 also increases in width W1 with increasing distance along the longitudinal axis 13 from the end surface 22 but with a different taper angle. The section 20 of the waveguide core 12 may be connected to other optical components.

The waveguide core 12 may be comprised of a dielectric material, such silicon nitride, having a refractive index greater than the refractive index of silicon dioxide. In an alternative embodiment, the waveguide core 12 may be comprised of silicon oxynitride. In an embodiment, the waveguide core 12 may be formed by depositing a layer of its constituent material by chemical vapor deposition on the dielectric layer 14 and patterning the deposited layer by lithography and etching processes.

The structure 10 includes multiple stages that are consecutively arranged. The inverse taper 18 of the waveguide core 12 is arranged in one of the stages, and the inverse taper 19 of the waveguide core 12 is arranged in another of the stages.

Figure 4:
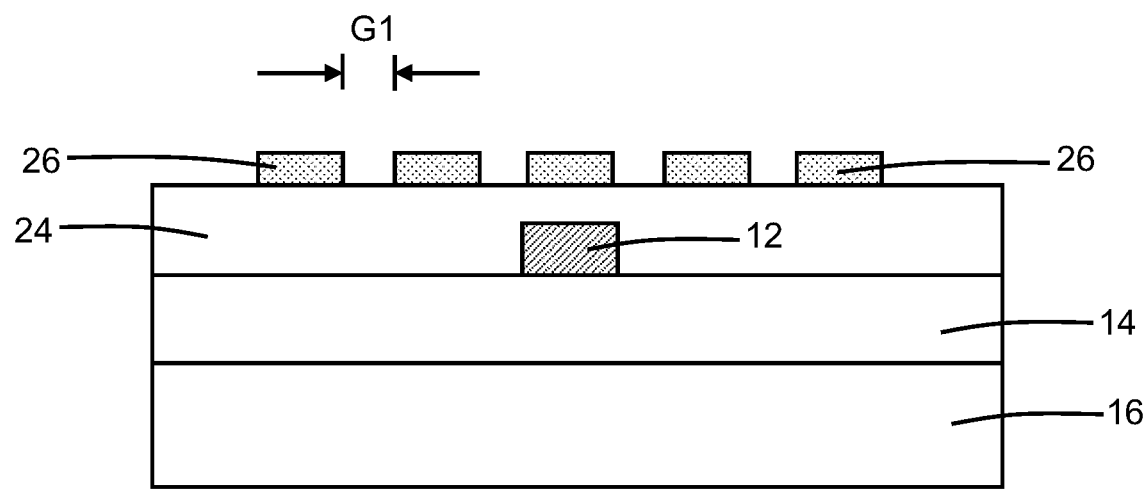
FIG. 4 is a cross-sectional view taken generally along line 4-4 in FIG. 3.
Figure 3:
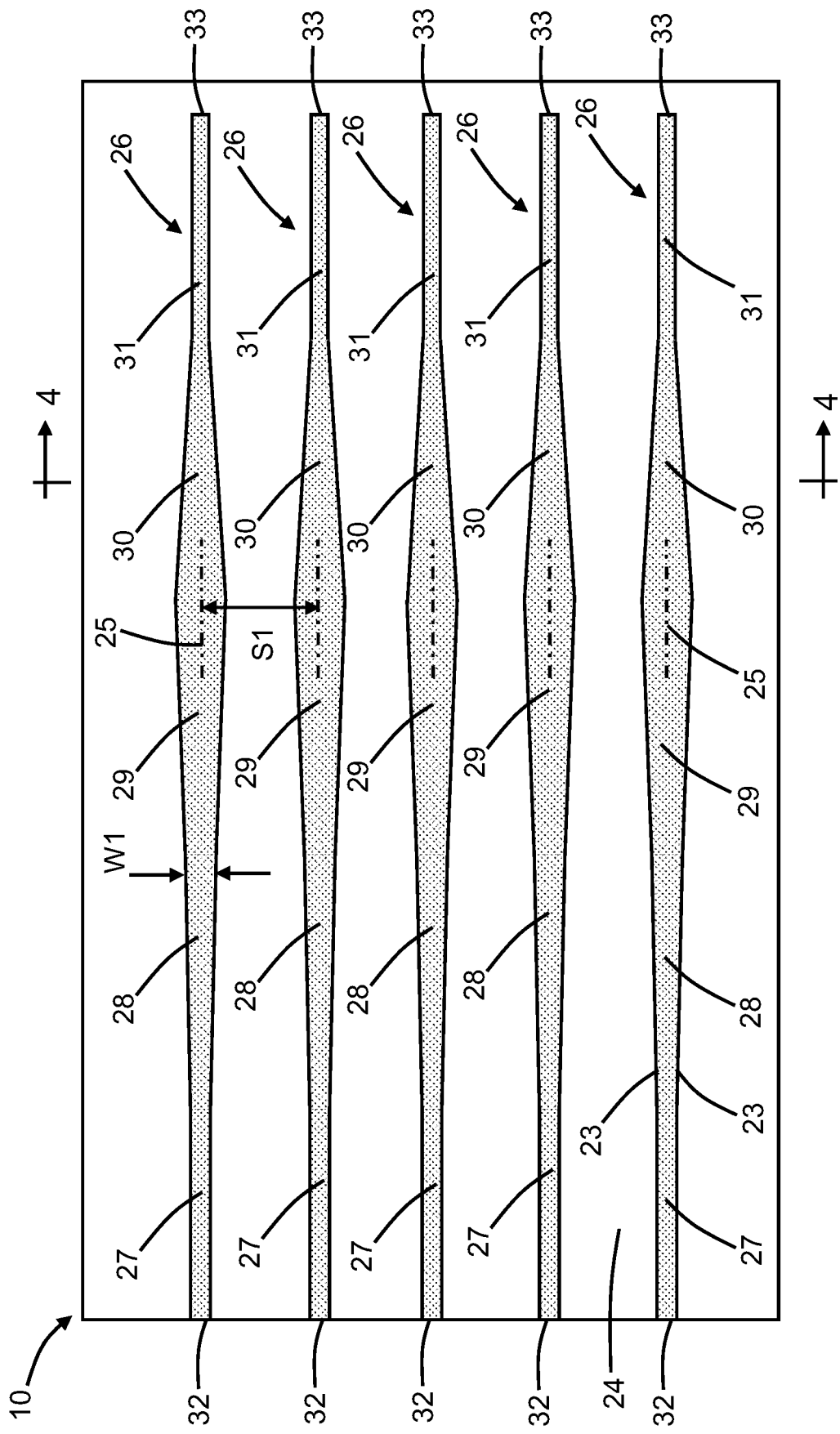
FIG. 3 is a top view of the structure at a fabrication stage of the processing method subsequent to FIG. 1.

With reference to FIGS. 3, 4 in which like reference numerals refer to like features in FIGS. 1, 2 and at a subsequent fabrication stage, a dielectric layer 24 is formed over the waveguide core 12. The dielectric layer 24 may be comprised of a dielectric material, such as silicon dioxide. The waveguide core 12 is embedded in the dielectric layer 24 because the dielectric layer 24 is thicker than the height of the waveguide core 12. The thickness of the dielectric layer 24 and the height of the waveguide core 12 may be adjustable variables. The dielectric material constituting the dielectric layer 24 may have a lower refractive index than the dielectric material constituting the waveguide core 12.

The structure 10 may further include multiple elements 26 that have a juxtaposed (i.e., side-by-side) arrangement. The elements 26 are constituted by elongated ridges (i.e., strips that are longer than wide) and, due to the juxtaposed arrangement, gaps G1 separate adjacent elements 26 to define a grating-like structure. Each element 26 may include a section 27, an inverse taper 28, an inverse taper 29, a taper 30, and a section 31 that are aligned along a longitudinal axis 25 and arranged in multiple stages. The inverse taper 28 is longitudinally positioned along the longitudinal axis 25 between the inverse taper 29 and the section 27, the inverse taper 29 is longitudinally positioned along the longitudinal axis 25 between the inverse taper 28 and the taper 30, and the taper 30 is longitudinally positioned along the longitudinal axis 25 between the inverse taper 29 and the section 31. In an embodiment, the section 27 may be adjoined (i.e., attached) to the inverse taper 28, the inverse taper 28 may be adjoined to the inverse taper 29, the inverse taper 29 may be adjoined to the taper 30, and the taper 30 may be adjoined to the section 31.

Each of the elements 26 has opposite side edges 23, a width W1 between the opposite side edges 23, and a length in a direction transverse to the width. The width W1 of the inverse taper 28 increases with increasing distance along the longitudinal axis 25 from the section 27, and the width W1 of the inverse taper 29 also increases with increasing distance along the longitudinal axis 25 from the section 27 but with a different taper angle. The width W1 of the taper 30 decreases with increasing distance along the longitudinal axis 25 from the section 27. The width W1 of the section 27 and the width W1 of the section 31 may be lengthwise constant.

Each element 26 may extend along the longitudinal axis 25 from an end 32 to an end 33, and each element 26 may terminate at the opposite ends 32, 33. In an embodiment, the end 33 of each element 26 may be aligned with the transition between the inverse taper 19 and the section 20 of the waveguide core 12. In an embodiment, the elements 26 may have a parallel alignment. In an embodiment, the elements 26 may have equal or substantially equal lengths between the opposite ends 32, 33. In an embodiment, the number of elements 26 may be greater than three.

Adjacent pairs of the elements 26 have a lateral spacing S1. In an embodiment, the lateral spacing Si may be measured between the centerlines (e.g., the longitudinal axes 25) of each adjacent pair of the elements 26. In an embodiment, the lateral spacing S1 may be uniform or constant between the centerlines of adjacent pairs of the elements 26 such that the width of the G between the inverse tapers 28, the inverse tapers 29, and/or the tapers 30 varies with position along the longitudinal axes 25. In an alternative embodiment, the lateral spacing S1 may be measured between the side edges 23 of adjacent pairs of the elements 26. In an alternative embodiment, the lateral spacing S1 may be uniform or constant between the side edges 23 of adjacent pairs of the elements 26 such that the width of the G between the inverse tapers 28, the inverse tapers 29, and/or the tapers 30 is uniform or constant with position along the longitudinal axes 25.

In the representative embodiment, the elements 26 are embodied in elongated ridges that are disconnected from each other. In an embodiment, the pitch and duty cycle of the elements 26 may be uniform to define a periodic juxtaposed arrangement. In alternative embodiments, the pitch and/or the duty cycle of the elements 26 may be apodized (i.e., non-uniform) to define a non-periodic juxtaposed arrangement. In an embodiment, each element 26 may have a rectangular or square cross-sectional shape in a direction parallel to the longitudinal axis 25.

The elements 26 may be comprised of a dielectric material, such as silicon-carbon nitride or hydrogenated silicon-carbon nitride, having a refractive index that is greater than the refractive index of silicon dioxide. In an alternative embodiment, the elements 26 may be comprised of silicon nitride, aluminum nitride, or silicon oxynitride. In an embodiment, the elements 26 may be formed by depositing a layer of their constituent material by chemical vapor deposition on the dielectric layer 24 and patterning the deposited layer by lithography and etching processes. In an alternative embodiment, a slab layer may be connected to a lower portion of the elements 26 and may join the elements 26. The slab layer may be formed when the elements 26 are patterned, and the slab layer, which is positioned on the dielectric layer 24, has a thickness that is less than the thickness of the elements 26.

The section 27, inverse taper 28, inverse taper 29, taper 30, and section 31 are longitudinally arranged in successive stages of each element 26. The waveguide core 12 is positioned in a vertical direction between the elements 26 of the metamaterial layer and the substrate 16. In an embodiment, the substrate 16 may be solid beneath the waveguide core 12. The taper 30 of each element 26 may be aligned with the inverse taper 18 of the waveguide core 12 that is in the same stage, and the section 31 of each element 26 may be aligned with the inverse taper 19 of the waveguide core 12 that is in the same stage. In an embodiment, one or more of the elements 26 may have an overlapping relationship with the inverse tapers 18, 19 of the waveguide core 12. In an embodiment, one or more of the elements 26 may have a non-overlapping relationship with the inverse tapers 18, 19 of the waveguide core 12. In an embodiment, the elements 26 may be centrally positioned over the waveguide core 12 to provide a symmetrical arrangement relative to the waveguide core 12. In an alternative embodiment, each element 26 may be lengthened such that the end 33 longitudinally the past the inverse tapers 18, 19.

Figure 5:
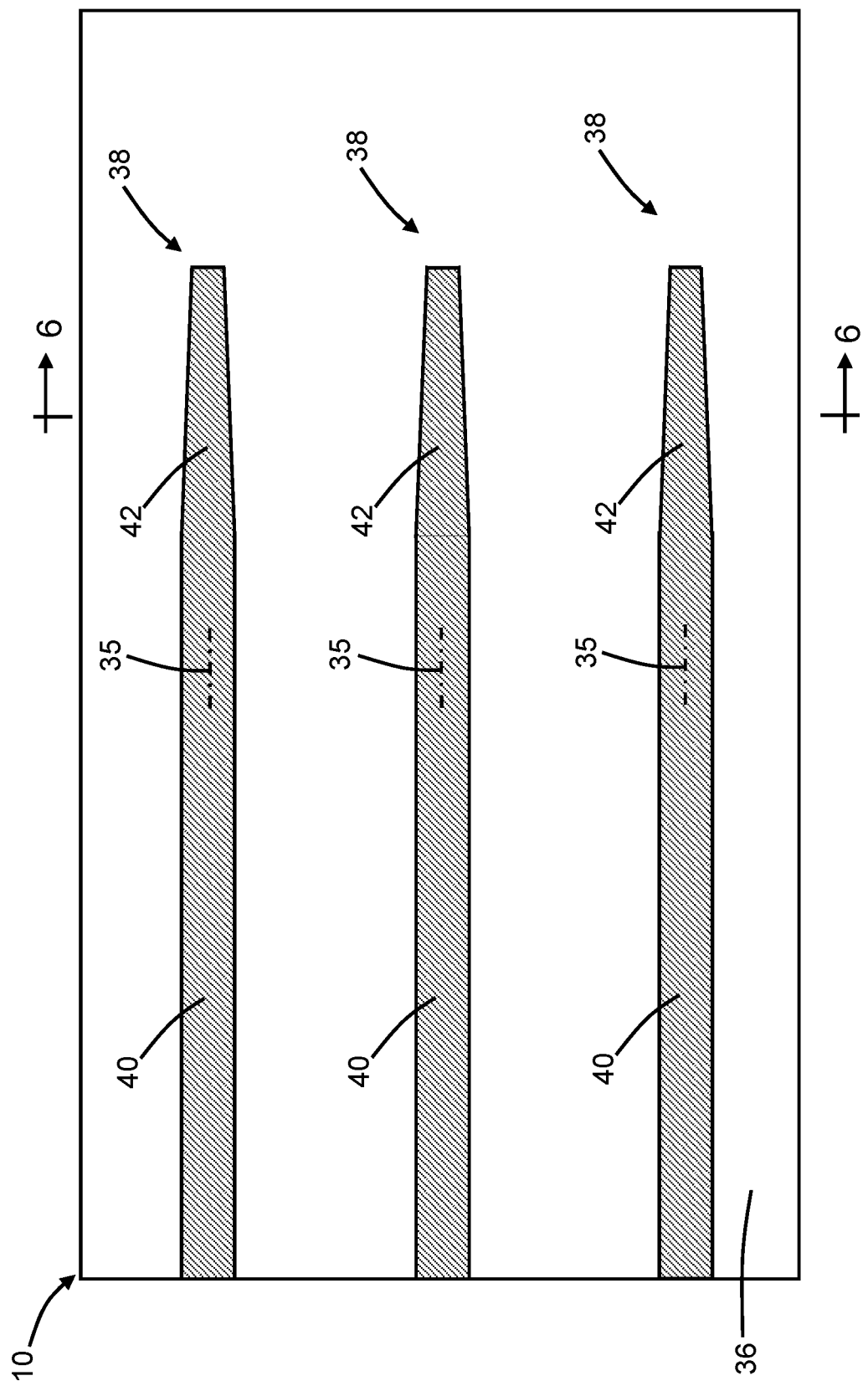
FIG. 5 is a top view of the structure at a fabrication stage of the processing method subsequent to FIG. 3.
Figure 6:
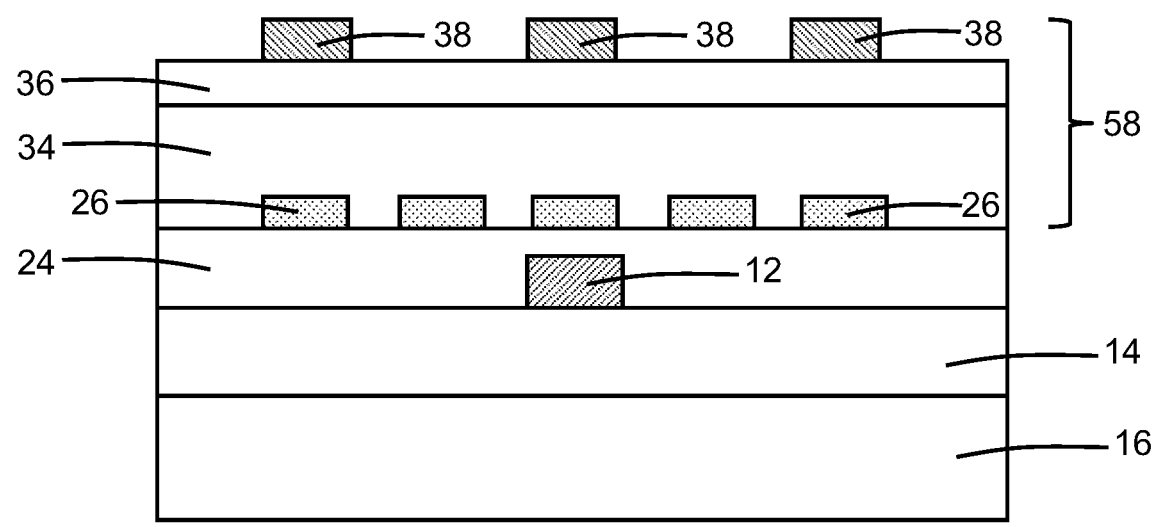
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, dielectric layers 34, 36 of a back-end-of-line stack 58 may be formed over the dielectric layer 24 and the elements 26. The dielectric layers 34, 36 may be comprised of a dielectric material, such as silicon dioxide, tetraethylorthosilicate silicon dioxide, or fluorinated-tetraethylorthosilicate silicon dioxide. The elements 26 are embedded in the dielectric layer 34 because the dielectric layer 34 is thicker than the height of the elements 26. The thickness of the dielectric layer 34 and the height of the elements 26 may be adjustable variables. The dielectric material constituting the dielectric layer 34 may have a lower refractive index than the dielectric material constituting the elements 26.

The dielectric material of the dielectric layer 34 is located in the gaps G1 between adjacent pairs of the elements 26. The elements 26 and the dielectric material of the dielectric layer 34 in the gaps G1 may define a metamaterial layer in which the dielectric material constituting the elements 26 has a higher refractive index than the dielectric material of the dielectric layer 34. The metamaterial layer including the elements 26 and the dielectric material of the dielectric layer 34 in the gaps G1 can be treated as a homogeneous material with an effective refractive index that is intermediate between the refractive index of the dielectric material constituting the elements 26 and the refractive index of the dielectric material constituting the dielectric layer 34.

The edge coupler may include additional waveguide cores 38 that are formed in a level of the back-end-of-line stack 58 over the elements 26. The waveguide cores 38 have a laterally-spaced juxtaposed arrangement on the dielectric layer 36. The waveguide cores 38 may be comprised of a dielectric material, such as silicon nitride, having a refractive index greater than the refractive index of silicon dioxide. In an embodiment, the waveguide cores 38 may be formed by depositing a layer of its constituent material by chemical vapor deposition on the dielectric layer 34 and patterning the deposited layer by lithography and etching processes. In an embodiment, the waveguide cores 38 may be comprised of a different dielectric material than the elements 26. In an embodiment, the waveguide cores 38 may be comprised of a dielectric material that lacks carbon in its composition.

Each of the waveguide cores 38 may be aligned along a longitudinal axis 35. Each of the waveguide cores 38 may be truncated at opposite ends. Each of the waveguide cores 38 may include a section 40 and a taper 42 that are arranged along the longitudinal axis 35 between the opposite ends. The sections 40 of the waveguide cores 38 may be positioned in the same stages of the structure 10 as the sections 27, the inverse tapers 28, and the inverse tapers 29 of the elements 26, and the tapers 42 of the waveguide cores 38 may be positioned in the same stage of the structure 10 as the tapers 30 of the elements 26 and the inverse taper 18 of the waveguide core 12.

Figure 7:
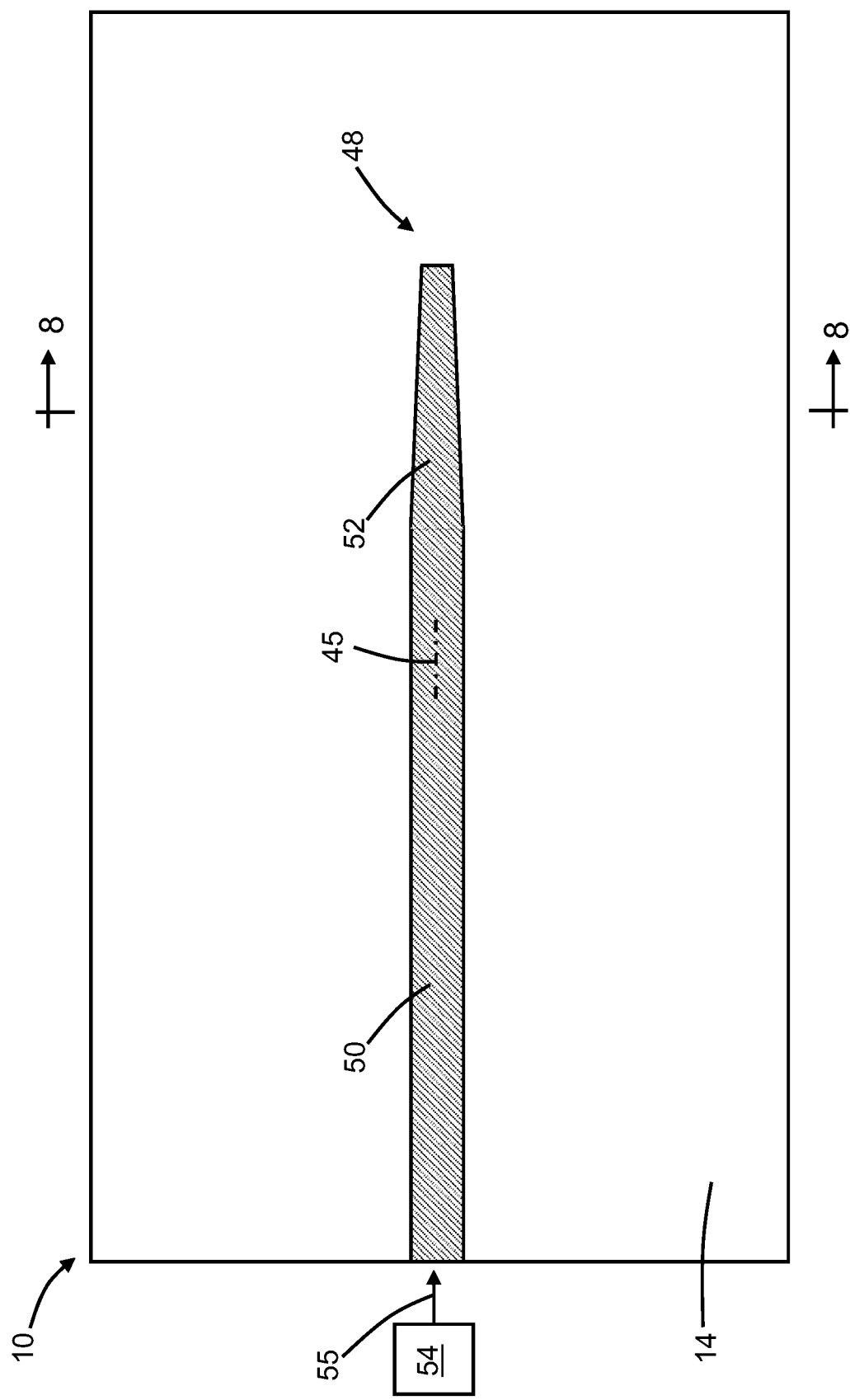
FIG. 7 is a top view of the structure at a fabrication stage of the processing method subsequent to FIG. 5.
Figure 8:
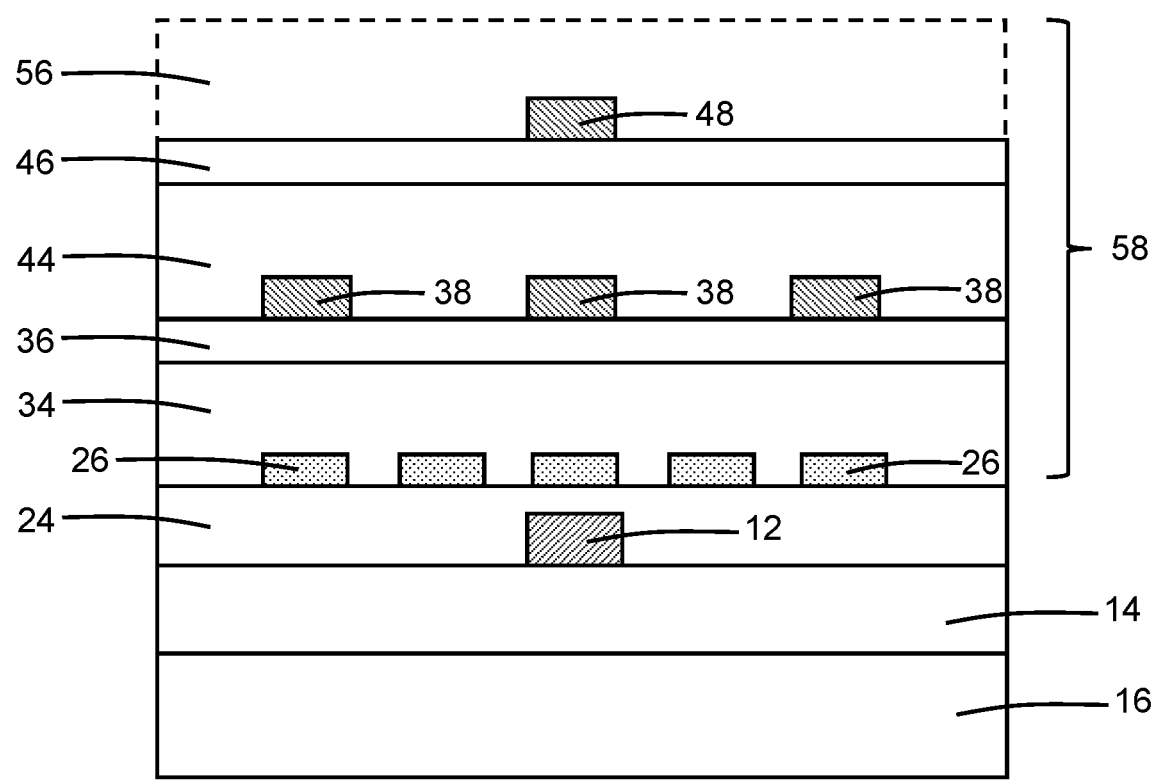
FIG. 8 is a cross-sectional view taken generally along line 8-8 in FIG. 7.

With reference to FIGS. 7, 8 in which like reference numerals refer to like features in FIGS. 5, 6 and at a subsequent fabrication stage, dielectric layers 44, 46 of the back-end-of-line stack 58 may be formed over the waveguide cores 38. The dielectric layers 44, 46 may be comprised of a dielectric material, such as silicon dioxide, tetraethylorthosilicate silicon dioxide, or fluorinated-tetraethylorthosilicate silicon dioxide. The waveguide cores 38 are embedded in the dielectric layer 44.

The edge coupler may include a waveguide core 48 that is formed in a level of the back-end-of-line stack 58 over the waveguide cores 38. In an embodiment, the waveguide core 48 may overlap with the central waveguide core 38. The waveguide core 48 may be aligned along a longitudinal axis 45. In an embodiment, the longitudinal axis 45 of the waveguide core 48 may be aligned parallel to the longitudinal axes 35 of the waveguide cores 38. The waveguide core 48 may be truncated at opposite ends 49 such that the waveguide core 48 has a length. In an embodiment, the waveguide core 48 and the central waveguide core 38 may have equal or substantially equal lengths. In an alternative embodiment, the waveguide core 48 may be shorter in length than the central waveguide core 38. The waveguide core 48 may include a section 50 and a taper 52 that are arranged along the longitudinal axis 45. The sections section 50 of the waveguide cores core 48 may be positioned in the same stages of the structure 10 as the sections 27 of the elements 26, the inverse tapers 28, and the inverse tapers 29 of the elements 26, and the taper 52 of the waveguide core 48 may be positioned in the same stage of the structure 10 as the tapers 30 of the elements 26 and the inverse taper 18 of the waveguide core 12.

The waveguide core 48 may be comprised of a dielectric material, such as silicon nitride, having a refractive index greater than the refractive index of silicon dioxide. In an embodiment, the waveguide core 48 may be formed by depositing a layer of its constituent material by chemical vapor deposition on the dielectric layer 46 and patterning the deposited layer by lithography and etching processes. In an embodiment, the waveguide core 48 may be comprised of the same dielectric material as the waveguide cores 38. In an embodiment, the waveguide core 48 may be comprised of a different dielectric material than the elements 26. In an embodiment, the waveguide core 48 may be comprised of a dielectric material that lacks carbon in its composition.

In alternative embodiments, the edge coupler may include additional waveguide cores in the level including the waveguide core 48. In alternative embodiments, the edge coupler may include additional waveguide cores in the level including the waveguide cores 38. In an alternative embodiment, a pair of the waveguide cores 38 may be eliminated in conjunction with additional waveguide cores being added in the level including the waveguide core 48.

Additional dielectric layers 56 (diagrammatically shown in dashed lines), including a dielectric layer 56 providing a moisture barrier, of the back-end-of-line stack 58 may be formed over the waveguide core 48.

Light (e.g., laser light) may be directed in a mode propagation direction 55 from a light source 54 toward the edge coupler. The light may have a given wavelength, intensity, mode shape, and mode size, and the edge coupler may provide spot size conversion for the light. In an embodiment, the light source 54 may be a single-mode optical fiber placed adjacent to the edge coupler. In an alternative embodiment, the light source 54 may be a semiconductor laser, and the semiconductor laser may be attached inside a cavity formed in the substrate 16.

The structure 10, in any of its embodiments described herein, may be integrated into a photonics chip that includes electronic components and additional optical components. For example, the electronic components may include field-effect transistors that are fabricated by CMOS processing.

The metamaterial layer including the elements 26 and the dielectric material of the dielectric layer 34 in the gaps G1 may function to reduce conversion and propagation loss from leakage to the substrate 16, even in the absence of an undercut in the substrate 16 beneath the edge coupler. The coupling or leakage loss reduction provided by the metamaterial layer may permit the elimination of an undercut as a leakage loss measure and may result in an undercut-free, solid substrate 16 beneath the waveguide core 12. Eliminating the undercut simplifies the process flow for forming the edge coupler, as well as potential mechanical issues resulting from removing a portion of the substrate 16 under the dielectric layer 14 and therefore eliminating a portion of the support beneath the waveguide core 12.

An edge coupler including the metamaterial layer may also be characterized by higher-order-mode suppression and a mode conversion characterized by fewer mode fluctuations. The metamaterial layer may also promote a reduction in the footprint of the edge coupler. In addition, the coupling losses for light of transverse electric and transverse magnetic polarization modes may be substantially equalized such that the coupling loss is substantially independent of the polarization mode.

Figure 9:
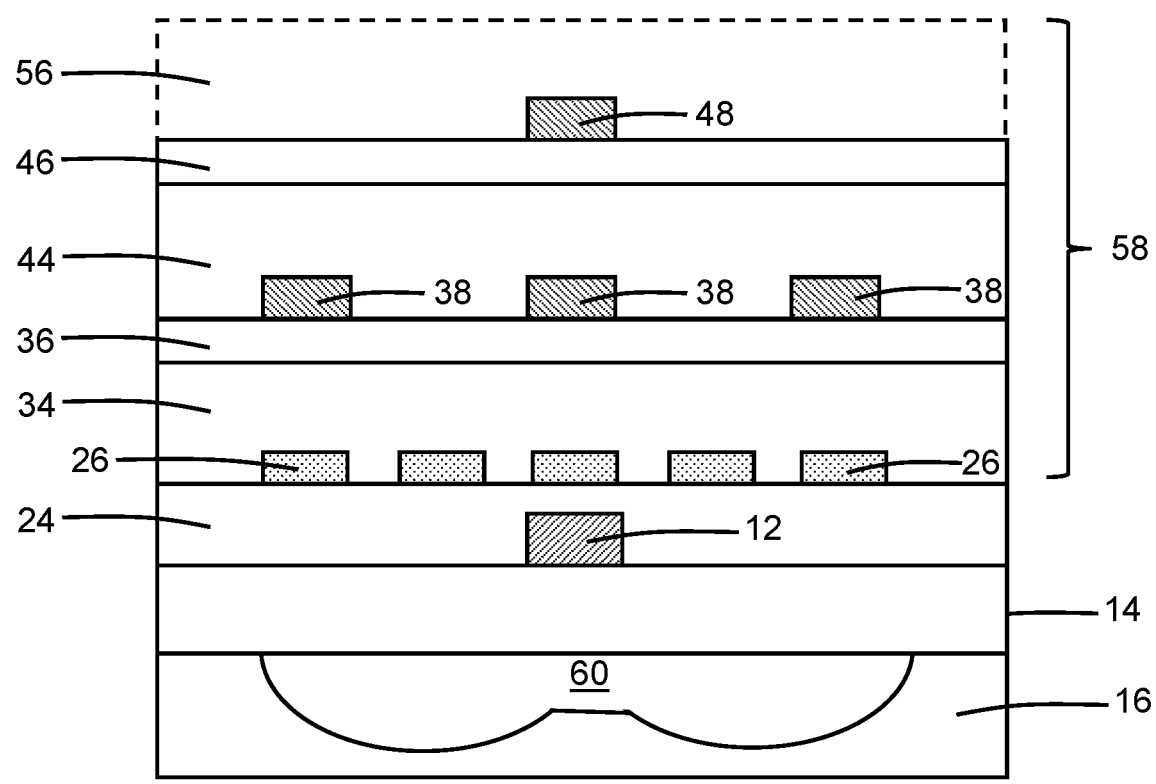
FIG. 9 is a cross-sectional view of a structure in accordance with alternative embodiments of the invention.

With reference to FIG. 9 and in accordance with alternative embodiments of the invention, an undercut 60 may be formed in the substrate 16 beneath the waveguide core 12. The waveguide core 12 and the elements 26 of the metamaterial layer overlap with the undercut 60. The undercut 60 may be formed by patterning pilot openings penetrating through the dielectric layer 14, and then etching the substrate 16 with access provided by the pilot openings using an isotropic etching process characterized by both lateral and vertical etching components. The undercut 60 may provide additional reductions in the leakage loss to the substrate 16.

Figure 10:
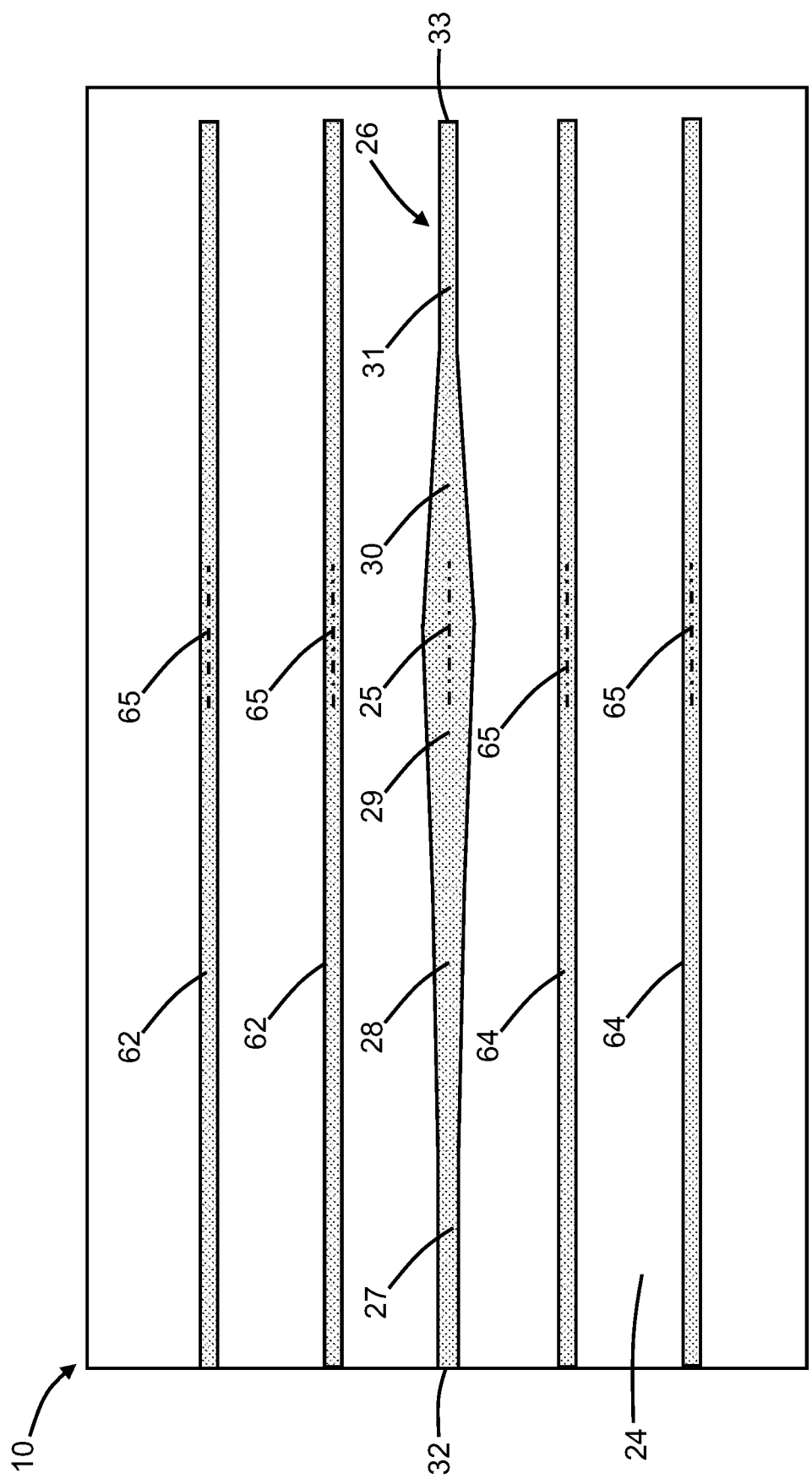
FIG. 10 is a top view of a structure in accordance with alternative embodiments of the invention.

With reference to FIG. 10 and in accordance with alternative embodiments of the invention, the peripheral elements 26 may be replaced by elements 62, 64 that are linear over their entire length instead of including multi-stage tapers. The central element 26 is laterally arranged in the juxtaposed arrangement between the elements 62 and the elements 64. The elements 62, 64 may be aligned along respective longitudinal axes 65 that, in the representative embodiment, are aligned with the longitudinal axis 25 of the central element 26. In an alternative embodiment, the longitudinal axes 65 may be inclined at an angle relative to the longitudinal axis 25. The metamaterial layer includes the elements 62, the elements 64, and the central element 26.

In the representative embodiment, the inverse tapers 28, 29 and the taper 30 are all replaced by non-tapered sections such that all stages are straight. In an alternative embodiment, only the stage including the inverse taper 28 may be replaced by a non-tapered section. In an alternative embodiment, only the stage including the inverse taper 29 may be replaced by a non-tapered section. In an alternative embodiment, only the stage including the taper 30 may be replaced by a non-tapered section. In an alternative embodiment, the stages including both of the inverse tapers 28, 29 may be replaced by non-tapered sections. In an alternative embodiment, the stages including the inverse taper 28 and the taper 30 may be replaced by non-tapered sections. In an alternative embodiment, the stages including the inverse taper 29 and the taper 30 may be replaced by non-tapered sections.

Figure 11:
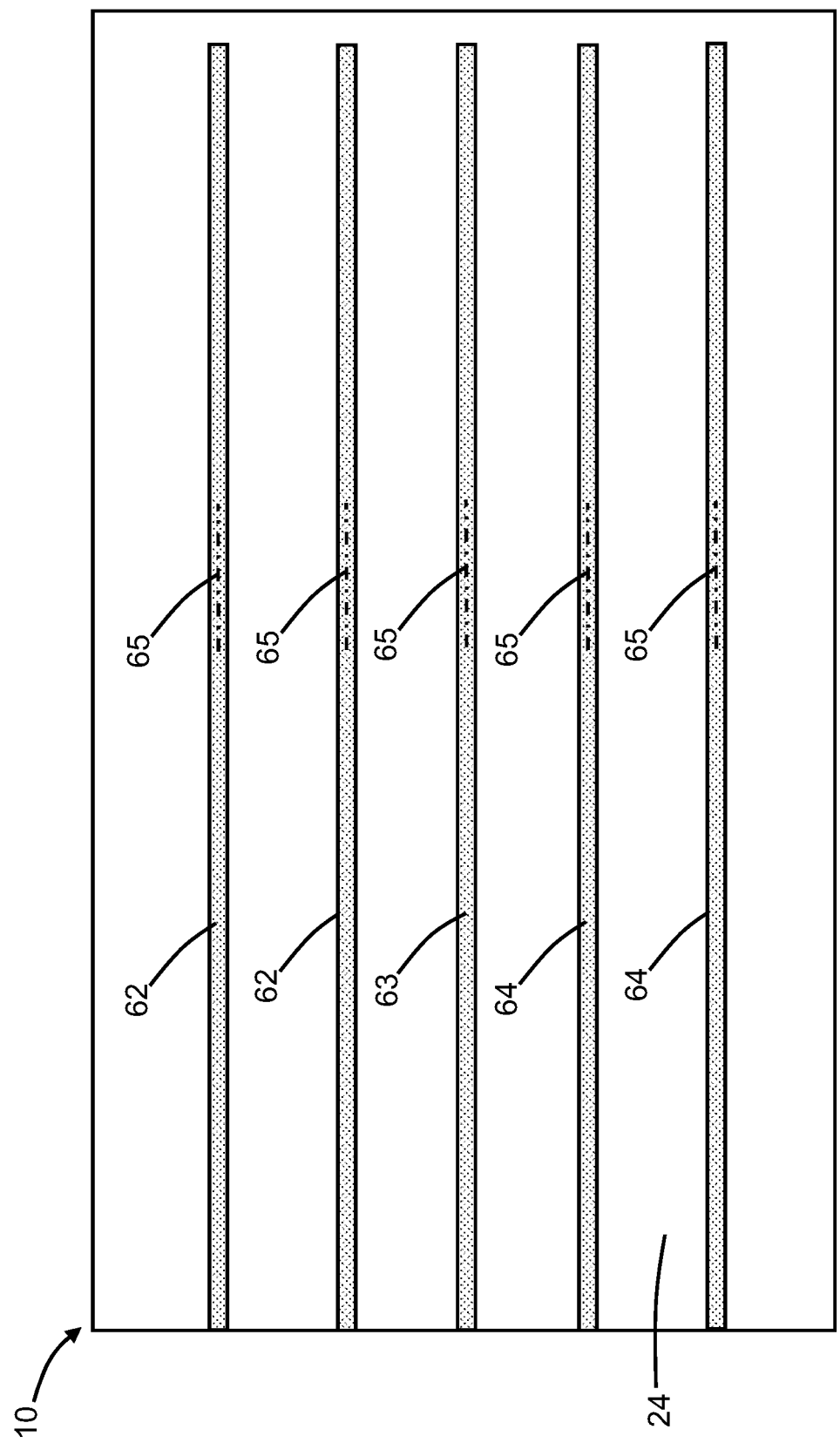
FIG. 11 is a top view of a structure in accordance with alternative embodiments of the invention.

With reference to FIG. 11 in which like reference numerals refer to like features in FIG. 10 and in accordance with alternative embodiments of the invention, the central element 26 may be replaced by an element 63 that is straight over its entire length. The metamaterial layer includes the elements 62, the elements 63, and the elements 64. In various embodiments, the element 63 may have the same stages as the elements 62, 64 as previously described.

Figure 12:
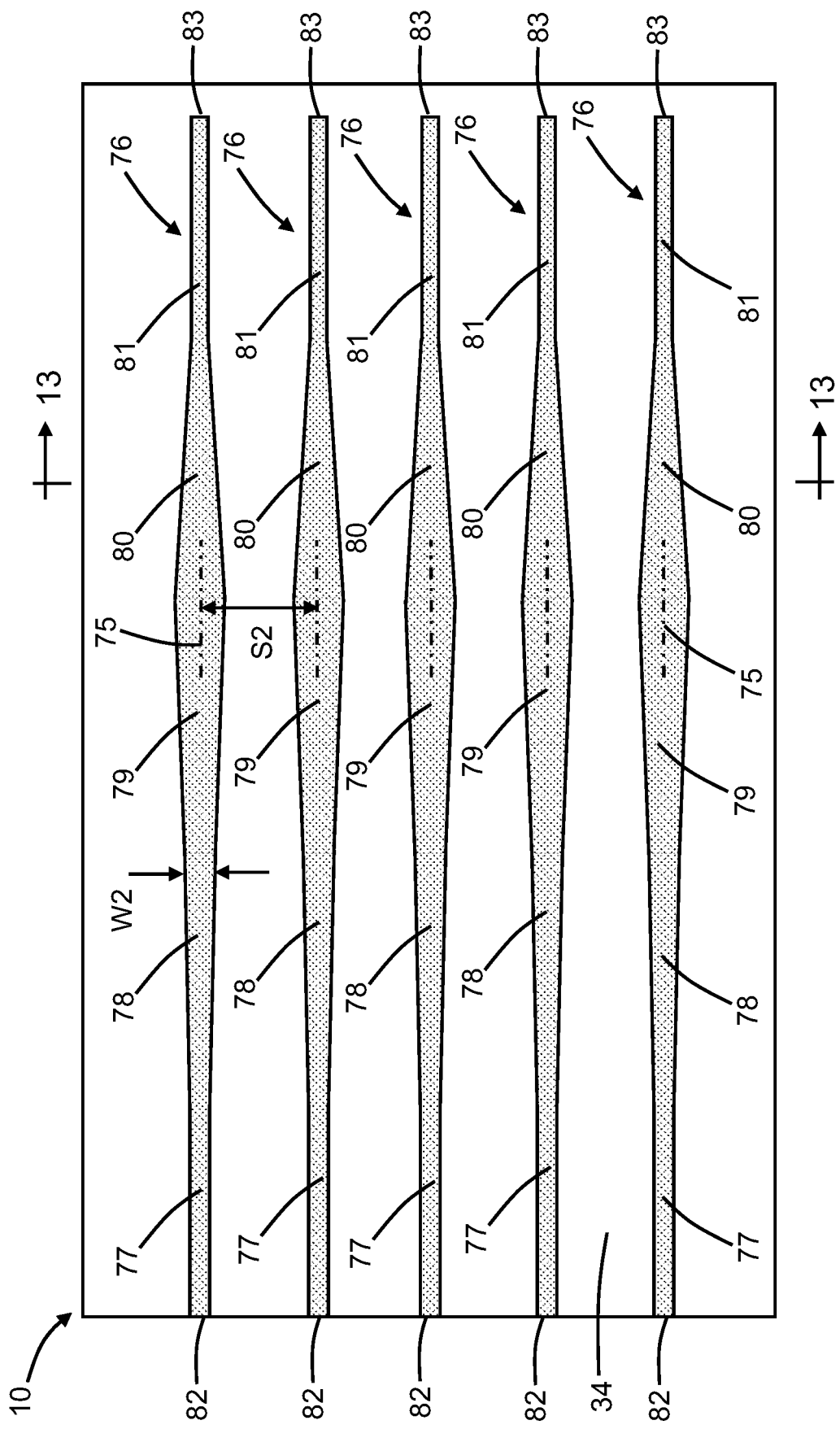
FIG. 12 is a top view of a structure at a fabrication stage of a processing method in accordance with alternative embodiments of the invention.
Figure 13:
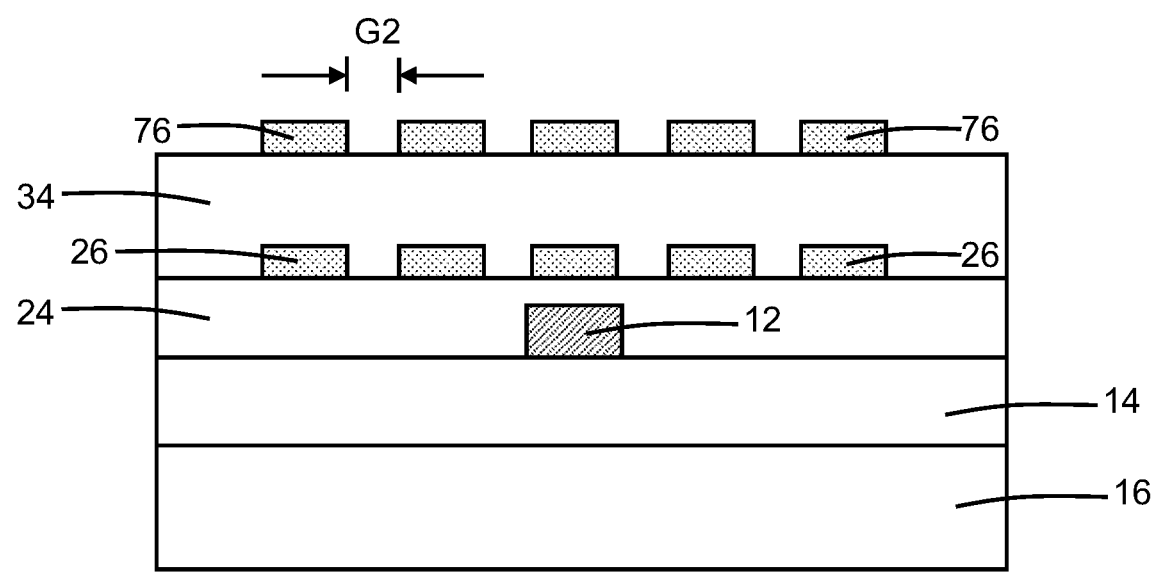
FIG. 13 is a cross-sectional view taken generally along line 13-13 in FIG. 12.

With reference to FIGS. 12, 13 and in accordance with alternative embodiments of the invention, multiple elements 76 may be added to the structure 10 and may be positioned with a juxtaposed (i.e., side-by-side) arrangement in a level of the back-end-of-line stack 58 between the level including the elements 26 and the level including the waveguide cores 38. The elements 76 are similar or identical in material, construction, etc. to the elements 26.

The elements 76 are constituted by elongated ridges (i.e., strips that are longer than wide) positioned on the dielectric layer 34 and, due to the juxtaposed arrangement, gaps G2 separate adjacent elements 76 to define a grating-like structure. Each element 76 may include a section 77, an inverse taper 78, an inverse taper 79, a taper 80, and a section 81 that are aligned along a longitudinal axis 75 and arranged in multiple stages. The inverse taper 78 is positioned along the longitudinal axis 75 between the inverse taper 79 and the section 77, the inverse taper 79 is positioned along the longitudinal axis 75 between the inverse taper 78 and the taper 80, and the taper 80 is positioned along the longitudinal axis 75 between the inverse taper 79 and the section 81. In an embodiment, the section 77 may be adjoined to the inverse taper 78, the inverse taper 78 may be adjoined to the inverse taper 79, the inverse taper 79 may be adjoined to the taper 80, and the taper 80 may be adjoined to the section 81.

Each of the elements 76 has opposite side edges, 73, a width W2 between the opposite side edges 73, and a length in a direction transverse to the width. The width W2 of the inverse taper 78 increases with increasing distance along the longitudinal axis 75 from the section 77, and the width W2 of the inverse taper 79 also increases with increasing distance along the longitudinal axis 75 from the section 77 but with a different angular slope. The width W2 of the taper 80 decreases with increasing distance along the longitudinal axis 75 from the section 77. The width W2 of the section 77 and the width W2 of the section 81 may be lengthwise constant.

Each element 76 may extend along the longitudinal axis 75 from an end 82 to an end 83, and each element 76 may terminate at the opposite ends 82, 83. In an embodiment, the end 83 of each element 76 may be aligned with the transition between the inverse taper 19 and the section 20 of the waveguide core 12. In an embodiment, the elements 76 may have a parallel alignment. In an embodiment, the elements 76 may have equal or substantially equal lengths between the opposite ends 82, 83. In an embodiment, the number of elements 76 may be greater than three. In an embodiment, each of the elements 76 may overlap with one of the elements 26 in the underlying metamaterial layer.

Adjacent pairs of the elements 76 have a lateral spacing S2. In an embodiment, the lateral spacing S2 may be measured between the centerlines (e.g., the longitudinal axes 75) of each adjacent pair of the elements 76. In an embodiment, the lateral spacing S2 may be uniform or constant between the centerlines of adjacent pairs of the elements 76 such that the width of the G2 between the inverse tapers 78, the inverse tapers 79, and/or the tapers 80 varies with position along the longitudinal axes 75. In an alternative embodiment, the lateral spacing S2 may be measured between the side edges 73 of adjacent pairs of the elements 76. In an alternative embodiment, the lateral spacing S2 may be uniform or constant between the side edges 73 of adjacent pairs of the elements 76 such that the width of the G2 between the inverse tapers 78, the inverse tapers 79, and/or the tapers 80 is uniform or constant with position along the longitudinal axes 75.

In the representative embodiment, the elements 76 are embodied in elongated ridges that are disconnected from each other. In an embodiment, the pitch and duty cycle of the elements 76 may be uniform to define a periodic juxtaposed arrangement. In alternative embodiments, the pitch and/or the duty cycle of the elements 76 may be apodized (i.e., non-uniform) to define a non-periodic juxtaposed arrangement. In an embodiment, each element 76 may have a rectangular or square cross-sectional shape in a direction parallel to the longitudinal axis 75.

The section 77, inverse taper 78, inverse taper 79, taper 80, and section 81 are longitudinally arranged in successive stages of each element 76. The taper 80 of each element 76 may be aligned with the inverse taper 18 of the waveguide core 12 and the taper 30 of elements 26 that is in the same stage, and the section 81 of each element 76 may be aligned with the inverse taper 19 of the waveguide core 12 and the sections 31 of the elements 26 that is in the same stage.

The elements 76 may be comprised of a dielectric material, such as silicon-carbon nitride or hydrogenated silicon-carbon nitride, having a refractive index greater than the refractive index of silicon dioxide. In an alternative embodiment, the elements 76 may be comprised of silicon nitride, aluminum nitride, or silicon oxynitride. In an embodiment, the elements 76 may be formed by depositing a layer of their constituent material by chemical vapor deposition on the dielectric layer 34 and patterning the deposited layer by lithography and etching processes. In an alternative embodiment, a slab layer may be connected to a lower portion of the elements 76 and may join the elements 76. The slab layer may be formed when the elements 76 are patterned, and the slab layer, which is positioned on the dielectric layer 34, has a thickness that is less than the thickness of the elements 76.

Figure 14:
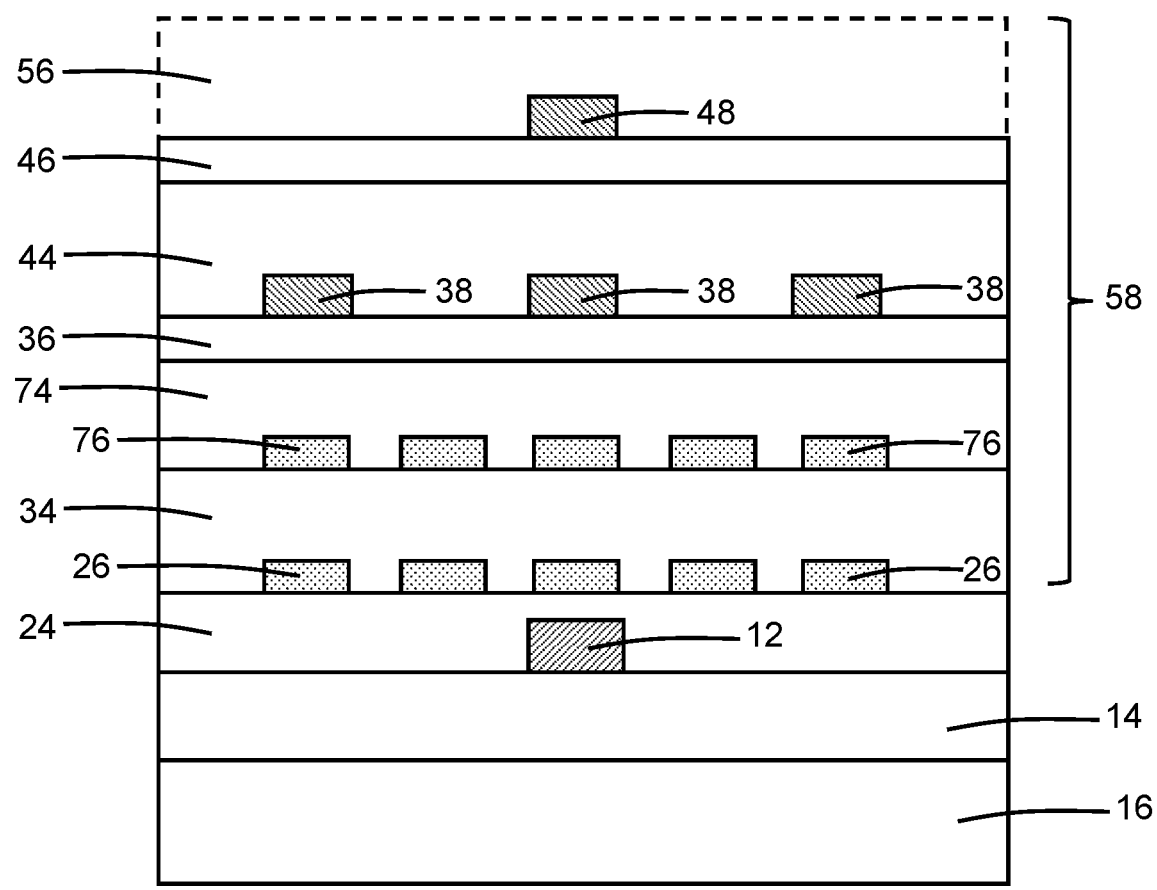
FIG. 14 is a cross-sectional view of the structure at a fabrication stage of the processing method subsequent to FIG. 13.

With reference to FIG. 14 in which like reference numerals refer to like features in FIG. 13 and at a subsequent fabrication stage, a dielectric layer 74 may be formed over the elements 76. The dielectric layer 74 may be comprised of a dielectric material, such as silicon dioxide. The elements 76 are embedded in the dielectric layer 74 because the dielectric layer 74 is thicker than the height of the elements 76. The thickness of the dielectric layer 74 and the height of the elements 76 may be adjustable variables. The dielectric material constituting the dielectric layer 74 may have a lower refractive index than the material constituting the elements 76.

The elements 76 and the dielectric material of the dielectric layer 74 in the gaps G2 define a metamaterial layer. The metamaterial layer including the elements 76 and the dielectric material of the dielectric layer 74 in the gaps G1 can be treated as a homogeneous material with an effective refractive index that is intermediate between the refractive index of the material constituting the elements 76 and the refractive index of the dielectric material of the dielectric layer 74. The metamaterial layer including the elements 76 is positioned in a vertical direction between the metamaterial layer including the elements 76 and the substrate 16 and also between the metamaterial layer including the elements 76 and the waveguide core 12.

The process continues as described above to complete the structure 10 that includes the added metamaterial layer including the elements 76 and the dielectric material of the dielectric layer 74 in the gaps G2.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
   a substrate;
   a first waveguide core; and
   a first metamaterial layer positioned in a vertical direction between the substrate and the first waveguide core, the first metamaterial layer including a first plurality of elements separated by a first plurality of gaps and a first dielectric material in the first plurality of gaps, each of the first plurality of elements including a first section, a first inverse taper adjoined to the first section, a second inverse taper adjoined to the first inverse taper, a taper adjoined to the second inverse taper, and a second section adjoined to the taper, the first section and the second section having a constant width, the second inverse taper having a different taper angle than the first inverse taper, the first inverse taper having a width that increases with increasing distance along a longitudinal axis from the first section, the second inverse taper having a width that increases with increasing distance along the longitudinal axis from the first section, and the taper having a width that decreases with increasing distance along the longitudinal axis from the first section.

2. The structure of claim 1 wherein each of the first plurality of elements includes a first end surface and a second end surface, and the first section, the first inverse taper, the second inverse taper, the taper, and the second section are longitudinally positioned between the first end surface and the second end surface.

3. The structure of claim 1 further comprising:
a light source configured to provide light in a mode propagation direction to the edge coupler,
wherein each of the first plurality of elements includes an end surface that is positioned adjacent to the light source.

4. The structure of claim 1 wherein the first waveguide core comprises silicon nitride, and the first plurality of elements comprise silicon-carbon nitride or hydrogenated silicon-carbon nitride.

5. The structure of claim 1 wherein the first waveguide core comprises silicon nitride, and the first plurality of elements comprise silicon nitride, aluminum nitride, or silicon oxynitride.

6. The structure of claim 1 wherein the substrate including an undercut, and the first waveguide core and the first plurality of elements have an overlapping arrangement with the undercut in the substrate.

7. The structure of claim 1 wherein the substrate is solid beneath the first waveguide core and the first plurality of elements.

8. The structure of claim 1 further comprising:
a second waveguide core, wherein the second waveguide core is positioned in the vertical direction between the first metamaterial layer and the substrate.

9. The structure of claim 1 further comprising:
a second waveguide core, wherein the second waveguide core is positioned in a lateral direction adjacent to the first waveguide core.

10. The structure of claim 1 wherein the first plurality of elements have a juxtaposed arrangement.

11. The structure of claim 1 further comprising:
a second metamaterial layer positioned in the vertical direction between the first metamaterial layer and the first waveguide core, the second metamaterial layer including a second plurality of elements separated by a second plurality of gaps and a second dielectric material in the second plurality of gaps.

12. The structure of claim 11 wherein each of the second plurality of elements includes a first inverse taper and a second inverse taper adjoined to the first inverse taper, and the second inverse taper has a different taper angle than the first inverse taper.

13. The structure of claim 12 wherein each of the second plurality of elements includes a taper, and the second inverse taper is longitudinally arranged between the first inverse taper and the taper.

14. A method of forming a structure for an edge coupler, the method comprising:
forming a metamaterial layer including a plurality of elements separated by a plurality of gaps and a first dielectric material in the plurality of gaps; and
forming a waveguide core,
wherein the metamaterial layer is positioned in a vertical direction between the waveguide core and a substrate, each of the plurality of elements includes a first section, a first inverse taper adjoined to the first section, a second inverse taper adjoined to the first inverse taper, a taper adjoined to the second inverse taper, and a second section adjoined to the taper, the first section and the second section have a constant width, the second inverse taper has a different taper angle than the first inverse taper, the first inverse taper has a width that increases with increasing distance along a longitudinal axis from the first section, the second inverse taper has a width that increases with increasing distance along the longitudinal axis from the first section, and the taper has a width that decreases with increasing distance along the longitudinal axis from the first section.

15. The method of claim 14 wherein forming the metamaterial layer including the plurality of elements separated by the plurality of gaps and the first dielectric material in the plurality of gaps comprises:
depositing a layer of a second dielectric material having a higher refractive index than the first dielectric material;
patterning the layer to form the plurality of elements with a juxtaposed arrangement; and
depositing the first dielectric material over the plurality of elements.

16. The method of claim 14 wherein each of the plurality of elements a first end surface and a second end surface, and the first section, the first inverse taper, the second inverse taper, the taper, and the second section are longitudinally positioned between the first end surface and the second end surface.

17. The structure of claim 1 wherein the first waveguide core includes a taper that is aligned with the first inverse taper of each of the first plurality of elements and an inverse taper that is aligned with the second section of each of the first plurality of elements.

18. The structure of claim 17 wherein one or more of the first plurality of elements has an overlapping relationship with the taper and the inverse taper of the first waveguide core.

19. The structure 1 wherein the first plurality of elements are centrally positioned over the first waveguide core to provide a symmetrical arrangement.

* * * * *